Figure 1:
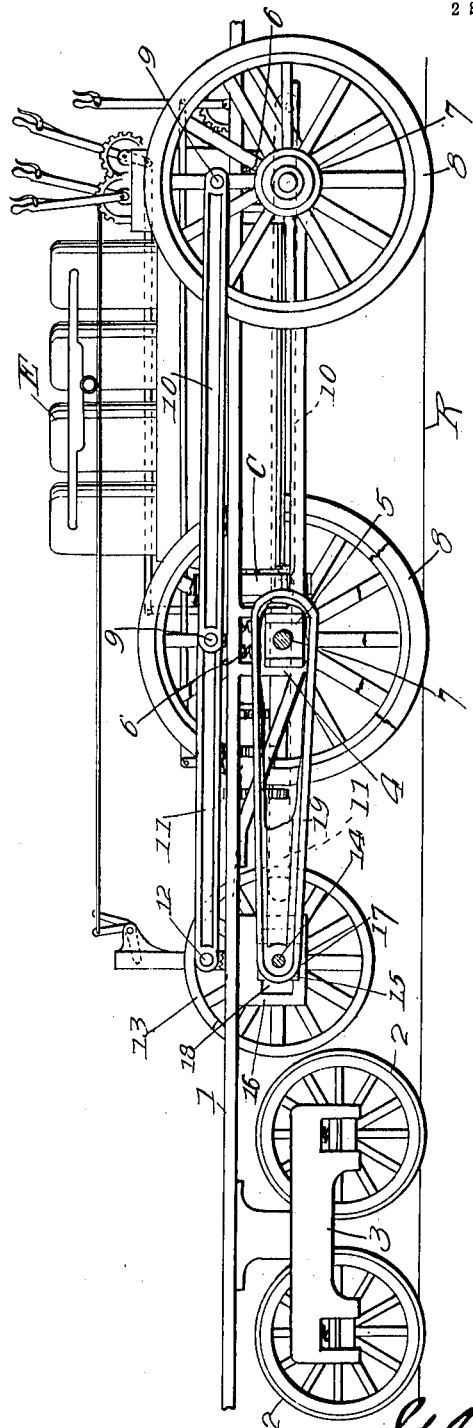

J. G. MacPHERSON.
EXPLOSIVE ENGINE LOCOMOTIVE.
APPLICATION FILED NOV. 27, 1911.

1,035,798.

Patented Aug. 13, 1912.
2 SHEETS—SHEET 1.

Witnesses

Inventor

J. G. MacPHERSON.
EXPLOSIVE ENGINE LOCOMOTIVE.
APPLICATION FILED NOV. 27, 1911.
1,035,798.
Patented Aug. 13, 1912.
2 SHEETS—SHEET 2.
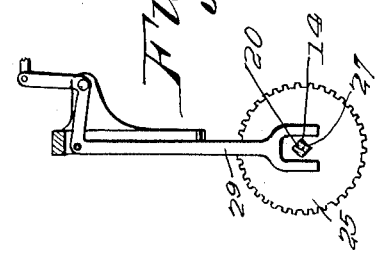
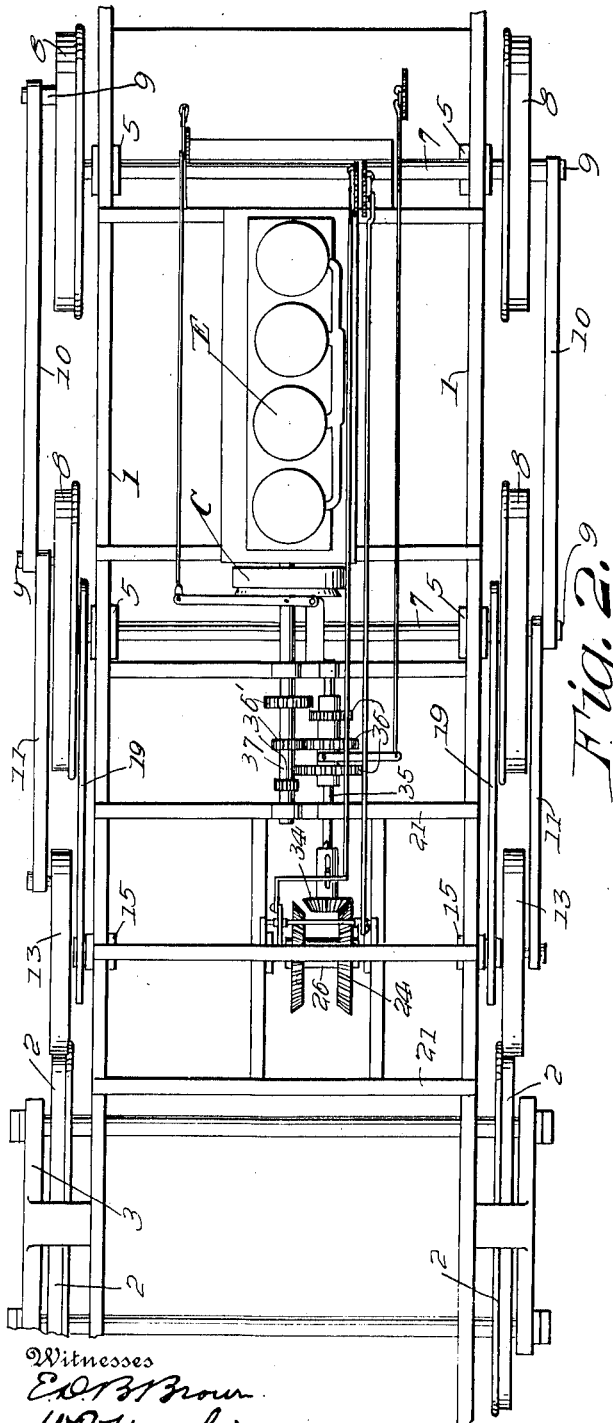
Witnesses
Inventor

UNITED STATES PATENT OFFICE.

JOHN G. MacPHERSON, OF PHILADELPHIA, PENNSYLVANIA.

EXPLOSIVE-ENGINE LOCOMOTIVE.

1,035,798.  Specification of Letters Patent.  Patented Aug. 13, 1912.

Application filed November 27, 1911. Serial No. 662,723.

*To all whom it may concern:*

Be it known that I, JOHN G. MACPHERSON, a citizen of the United States, residing at Philadelphia, in the county of Philadelphia and State of Pennsylvania, have invented certain new and useful Improvements in Explosive-Engine Locomotives, of which the following is a specification.

This invention relates to an improved explosive-engine locomotive, the primary object of the invention being the provision of a driving wheel and connecting-rod locomotive mechanism, operably connected through an intermediate shaft, which shaft itself is driven from an explosive engine of a four-cylinder, or more, four-cycle type, the main axis of the intermediate shaft being in substantially the same horizontal line as the axle of the drive or tractor wheels, said shaft and the forward drive axle being held in proper relative position, or relation to each other, through the medium of a radius plate.

A further object of the invention, is the provision of a radius plate connection between the axle or shaft, receiving motion through a clutch, a variable speed transmission, and a reversing mechanism for an explosive engine, and the drive or tractor wheel axle box in the main frame, whereby the centers of the said shaft and drive axle will be maintained relatively to one another under all varying conditions.

To more thoroughly understand this invention and appreciate the utility thereof, attention is invited to the accompanying drawings, in which:—

Figure 1 is a side elevation of an explosive-engine locomotive made according to and embodying the present invention, the center drive or tractor wheel and intermediate shaft wheel upon the near side, being shown fragmentary to clearly show the connection of the radius plate. Fig. 2 is a top plan view of the complete explosive-engine locomotive frame and parts, the forward end being broken away. Figs. 3 and 4 are detail views of the reversing mechanism.

Referring to the drawings, the numeral 1 designates the main frame of the locomotive, which when used for explosive engine propulsion, carries a main body, (not shown), which may be devised as desired, the forward end of the frame being supported by the pilot truck 3, and the wheels 2. Carried by and depending from the main frame, are the brackets 4, arranged in pairs for the vertical sliding reception of the boxes 5, which are mounted with springs 6, interposed between them and the main frame. Mounted in these boxes 5 are the axles 7, carrying the drive or tractor wheels, or driven elements 8. Carried by each drive or tractor wheel 8, is a pin 9, which properly connects said wheels 8, by means of connecting the drive rod 10 and 11, thereto, whereby motion may be transmitted to the tractors or drive wheels from the two oppositely disposed balance wheels 13, which are connected to the forward end of the connecting rod 11 to pin 12 carried by wheel 13, the rods 10 and 11, thus being pivoted to the respective drive or tractor wheels 8, and wheels 13, at a point the same distance from the center of the respective axles 7 and shaft 14. By this means, the action of the wheels 13 is imparted to the tractor wheels 8, and the rods 10 and 11 will at all times remain in substantially a parallel with the rails R of the system. The outer cylindrical end of the shaft 14 is journaled in boxes 15, which are mounted so that slight forward and rearward movements between the brackets 16 and the lower plate 17, and underside of the main frame 1, prevent any vertical movement.

In order to allow for the vertical movement of the box 5 of the forward tractor or drive wheels 8, due to the cushioning effect of the springs 6, and not affect the transmission of power from the shaft 14 to the tractor or drive wheels 8, a radius plate 19, is connected to the axle box 5 of the forward drive or tractor wheels, upon both sides of the main frame 1, and the shaft box 15 of shaft 14, thus spacing them, and retaining them at all times in the same relative position, and so that power may be effectually transmitted from the explosive engine E to the tractor or drive wheels 8, through the connecting rods 10 and 11, and wheels 13. The connection of the pins 12 to the two wheels 13 are upon the quarter, as in steam locomotive connections, thus avoiding any dead centers in starting the drive or tractor wheels from any position. The main portion of the shaft 14 is square as at 20, the frame 22, being supported by the main frame 1, by the arms 21, and carrying the pedestals 23, one upon each side of the spool 26, which as shown, carries the forward gear 24 and the reverse gear 25. The spool 26 is provided with a squared bore 27, to slidably fit upon the squared portion 20, of the shaft 14, thus providing a strong and durable connection at such point, and one having greatest grip upon the axle or shaft 14.

In order to slide the spool 26 and its gears 24 and 25, to forward, neutral and reverse positions, the two wedge plates 28 and 29 are provided and disposed to be alternately forced between and pulled from between the inner faces of the pedestals 23 and the adjacent faces of the gears 24 and 25, the double bar 30, being connected at 31 and 32 to the respective wedge plates, and a rod 33 is provided to impart the proper rocking movement to the bar 30 to actuate the gears 24 and 25. By reason of the co-action of the wedge plates, there is no idle play or space between the parts, that is, the wedge plates are disposed to occupy the entire space between the outer faces of the respective gears and the pedestals, thus making the action of the spool positive, insuring the proper movement of the spool, and its retention at the desired place.

Journaled longitudinally to the main frame 1, and in reality in line with the axle of the shaft 14, is the intermediate drive shaft 35, which carries at its forward end, the bevel gear 34, disposed to be engaged by either one of the gears 24 or 25, this gear 34 remaining at all times in a permanent position relative to the shaft 14 and gears 24 and 25. Carried by this intermediate shaft 35, are the variable speed transmission gears 36, which receive their motion from the gear 38', upon the engine shaft 37, of the explosive engine E. A clutch C is interposed between the shaft 37 and the engine E, whereby the engine may run freely when not transmitting power to the locomotive, and so that the variable speed transmission and gears 34, and 24 and 25 will not be affected.

What I claim as new is:—

1. In an explosive-engine locomotive, the combination with a main frame, tractor wheels journaled upon each side of the main frame, said tractor wheels having a journal capable of vertical movement, connecting rods operably connecting the respective sets of tractor wheels upon each side of the main frame, a driving shaft, a connecting rod connected to the respective ends of the driving shaft and the forward one of each set of tractor wheels, and a boxing surrounding the driving shaft at each side of the main frame, of a radius plate spacing the boxing and each forward tractor wheel and permitting the axle of the tractor wheel its vertical movement without changing the distance between the driving axle and the axle of the forward tractor wheel.

2. In an explosive-engine locomotive, the combination with a main frame, an explosive engine mounted therein, a set of tractor wheels mounted upon each side of the engine and mounted to have a vertical movement relatively to the main frame, a driving shaft operably connected to the engine, and a connecting rod operably connecting each end of the driving shaft to the forward tractor wheel of each set, of a radius plate maintaining the relative relation of the driving shaft and axles of the forward tractor wheels at all times and under all traffic conditions.

3. In an explosive-engine locomotive, the combination of a main frame, an explosive engine mounted therein, a set of tractor wheels carrying the main frame and capable of a vertical movement relatively to the frame, connecting rods for each set, a driving shaft operably connected to the engine, a boxing carrying each end of said shaft and mounted to have sliding movements to and from the tractor wheels, a connecting rod connected to each end of the driving shaft and forward tractor wheels, and a radius plate connected to each boxing and the axle of the forward tractor wheel of each set to maintain the shaft and axle of the forward tractor wheels in the same relative position.

4. In an explosive-engine locomotive, the combination of a main frame, an explosive engine, variable speed transmission operably connected therewith, two sets of tractor wheels, one set upon each side of the main frame, connecting rods operably connecting the respective sets together, said tractor wheels being capable of vertical sliding movements relative to the main frame, a driving shaft, a reversing mechanism operably connecting said variable speed transmission and the engine to said driving shaft, a boxing longitudinally slidable in the main frame at each side and in which said driving shaft is journaled, a connecting rod operably connecting the forward tractor wheel of each set to said driving shaft, and a radius plate connected to each boxing and the axle of the forward tractor wheel of each set to maintain the driving shaft and forward tractor wheels in the same spaced relation at all times.

In testimony whereof I affix my signature in presence of two witnesses.

JOHN G. MacPHERSON.

Witnesses:
ELLEN MARIE TOBIN,
W. R. WOODFORD.